United States Patent

Sirtl

[15] 3,661,637

[45] May 9, 1972

[54] METHOD FOR EPITACTIC PRECIPITATION OF SILICON AT LOW TEMPERATURES

[72] Inventor: Erhard Sirtl, 809 Adams Drive, Midland, Mich. 48640

[73] Assignee: Siemens Aktiengesellschaft, Berlin, Germany

[22] Filed: Dec. 22, 1969

[21] Appl. No.: 887,251

[30] Foreign Application Priority Data

Jan. 2, 1969 Germany ....................P 19 00 116.2

[52] U.S. Cl. ..........................117/201, 23/223.5, 117/93.3, 117/106 A, 117/213, 148/175

[51] Int. Cl. ..................C01b 33/02, H01l 7/36, C23c 11/00

[58] Field of Search ...................117/201, 213, 106 A, 93.3, 117/93.31; 148/174, 175; 23/223.5

[56] References Cited

UNITED STATES PATENTS

| | | | |
|---|---|---|---|
| 3,047,438 | 7/1962 | Marinace | 117/106 A X |
| 3,017,251 | 1/1962 | Kelemen | 117/106 A X |
| 3,546,036 | 12/1970 | Manasevit | 148/174 X |
| 3,341,360 | 9/1967 | Nickl | 117/106 A X |
| 3,458,368 | 7/1969 | Haberecht | 117/201 X |
| 3,486,933 | 12/1969 | Sussmann | 117/106 X |

FOREIGN PATENTS OR APPLICATIONS

| | | | |
|---|---|---|---|
| 932,418 | 7/1963 | Great Britain | 117/106 A |

*Primary Examiner*—Alfred L. Leavitt
*Assistant Examiner*—Kenneth P. Glynn
*Attorney*—Curt M. Avery, Arthur E. Wilfond, Herbert L. Lerner and Daniel J. Tick

[57] ABSTRACT

A method for producing highly pure, monocrystalline silicon layers, with or without dopant additions, upon a wafer shaped substrate body, which comprises thermal dissociating a gaseous silane compound, and by precipitating silicon upon a heated substrate body located in a reaction chamber. The crystalline structure of the silicon body is exposed e.g. by etching and its surface is flooded by the reaction gas. The silane compound is a dihalogen silane of formula $SiH_2X_2$, wherein X is chlorine, bromine, or iodine. The thermal dissociation is effected by heating the substrate body at low temperatures, preferably within a temperature range between 600° and 1,000° C.

8 Claims, 1 Drawing Figure

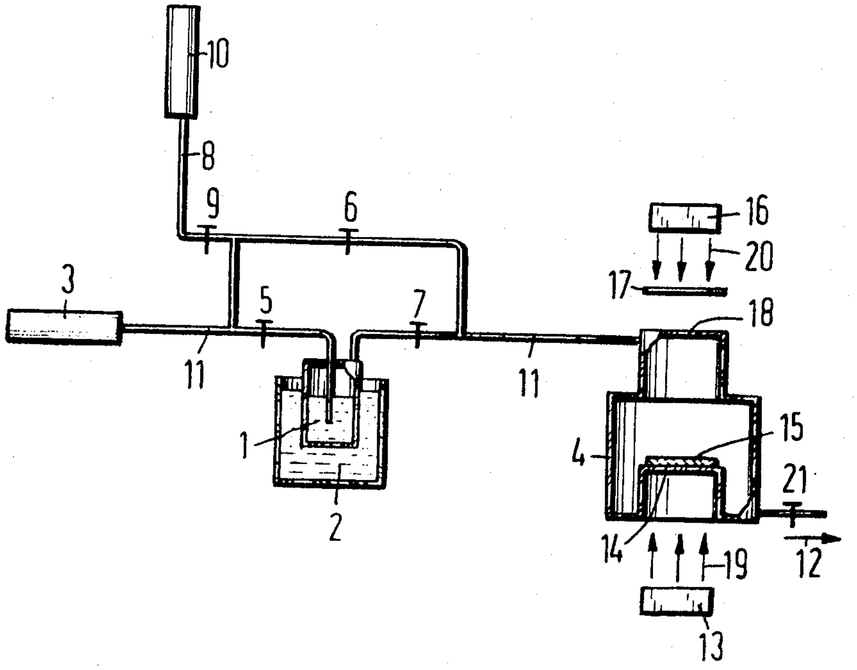
10
8
9
6
16
20
17
18
3
5
7
11
11
1
2
4
15
21
14
19
12
13

METHOD FOR EPITACTIC PRECIPITATION OF SILICON AT LOW TEMPERATURES

The invention relates to a method of producing highly pure monocrystalline layers of silicon, with or without dopant additions, upon a preferably wafer shaped substrate through thermal dissociation of a gaseous silane, particularly mixed with a carrier gas and by precipitating silicon upon a heated substrate body arranged in a reaction chamber. The crystalline structure of the substrate body is exposed, for example by etching and its surface is flooded by the reaction gas.

In the known method for producing monocrystalline semiconductor material, particularly silicon, through precipitation from the gaseous phase and through epitactic growth on a heated substrate body, operations are so effected that a crystalline substrate body, whose structure is exposed through a suitable pre-treatment, such as etching, is heated to a temperature which is lower than the temperature at which maximum precipitation of the semiconductor material occurs on the substrate body, with the chosen combination of the reaction gas. The reaction gas thereby floods the surface of the carrier body, preferably in a turbulent manner. The heating of the substrate body is effected in this method through direct current passage, through high frequency or through radiation. The heat distribution in the substrate body results in a uniform design of the monocrystalline growth layers. In order to obtain a grown layer that is as error free as possible, the substrate body should be of very high purity. Otherwise a strong diffusion of impurities will take place from the substrate body into the grown layer. This disturbing diffusion from the substrate body into the growth layer makes it obvious to use the lowest possible temperatures.

It is known to undertake such precipitation in a high vacuum. This method is often difficult from the technical viewpoint and is connected with considerable time effort.

It is known to dissociate hexachlorosilane ($Si_2Cl_6$) through photolysis, by forming oriented silicon layers.

The present invention relates to another embodiment for epitactic silicon layers and uses as a silane compound a dihalogen silane of the formula $SiH_2X_2$, whereby X = chlorine, bromine, or iodine. The thermal dissociation is to be brought about by heating a substrate body at low temperatures, preferably within a range between 600° and 1,000° C. This method has the advantage over the known method, in that the original compounds dissociate under formation of active hydrogen at the phase boundary and are easier to obtain in pure form or to purify (particularly oxygen containing compounds) which is very important for the quality of the precipitated silicon layers.

It is within the framework of the invention to heat the substrate according to a predetermined pattern or exclusively by radiation energy. The silane compounds of the invention are particularly suited to this end. Another advantage over the hexachlorine silane is that the lower halogen content per Si-atom permits a greater variation regarding the selection of the carrier gas and of the temperature.

It was found particularly preferable to use infrared radiation for heating the substrate body, and to use ultra-violet radiation for a catalytical activation of the processes in the vicinity of the substrate surface. This is preferably effected with the aid of a UV radiator or a UR radiator outside the reaction chamber.

In a further development of the invention, the thermal dissociation of the silane compound is carried out in a noble gas atmosphere. When a noble gas atmosphere is used, a beneficial influence of the reaction can be brought about especially through a photo action. This makes the method of the invention particularly well suited for a selective, epitactic growth without previously applying a masking.

The radiation which serves to heat certain regions of the substrate body can be concentrated through optical systems, if necessary via diaphragms, upon specific places of the substrate body. It is just as possible to use laser beams for heating surface regions, possibly according to the raster method. The measure of additional or of exclusive heating of regions, according to the invention offers entirely new possibilities for the use of the epitaxy method. If specific regions of the substrate surface are heated, for example, by optical means to above the median temperature of the substrate body, it is possible to precipitate material at the hotter or optically excited parts, without the necessity of using a mask of a foreign material. Foreign substances in the vicinity of the layer to be precipitated, always entail the danger of contaminating the semiconductor or the grown layer. In this manner, one can produce patterns and figures which are used in the multiple production of transistor systems.

According to a particularly preferred embodiment of the invention, the substrate body is subjected prior to thermal dissociation of the silane compound, to a surface treatment through the action of sulphur hexafluoride ($SF_6$) or nitrogen trifluoride ($NF_3$) in a noble gas atmosphere, at temperatures between 500° and 800° C. As a result, the crystal quality of the precipitated layer or layers is comparable to that obtained at higher temperatures.

The thermal dissociation of the silane compound can also be effected at reduced pressure, preferably in a dynamic vacuum of $10^{-3}$ to 1 Torr. Naturally, the reaction temperature must then be adjusted to the pressure conditions.

The present invention is particularly advantageous for the production of silicon semiconductor components, particularly those with sharp PN junctions, as for example capacitance diodes. Another usage possibility is afforded for devices, in the sense of the metal-base transistor, with silicon used as the original material.

More details will be derived from embodiments, with reference to the drawing, disclosed in which The FIGURE schematically illustrates a device for producing epitactic growth layers or wafer shaped substrate bodies.

In the drawing, a vaporizing vessel 1, situated in a temperature bath 2 and kept at −30° C contains a silane compound of the chemical composition $SiH_2H_2$, whereby X is chlorine, bromine or iodine, and is mixed with hydrogen, argon or helium, which is taken from a storage container and which must be oxygen free, and steam and then introduced into the reaction chamber 4, of quartz. The mixing ratio of the gaseous component can be adjusted by operating valves 5, 6 and 7 and can be varied. The flow rate is in the range of 100 to 500 liters/hour. Moreover, the amount of the evaporating silane compound can be varied by the choice of temperature for the vaporizing bath 2. A branch lead 8 and the supply valve 9 afford the opportunity to effect a surface treatment of the substrate body 15, prior to thermal dissociation, with the aid of nitrogen trifluoride, taken from the storage vessel.

The reaction mixture which reaches the reaction chamber 4 via the main line 11, is removed following the reaction process, from the reaction chamber through outlet openings 12, with valve 21 open. The thermal dissociation, that is the reaction of the reaction gas takes place on the silicon crystal wafer 15, which sits upon the planar parallel quartz plate 14, which is heated from below, by infrared radiator 13. The temperature of the silicon substrate crystal 15 can be easily checked, pyrometrically, via the planar-parallel quartz plate 14. The temperature of the substrate is adjusted through the infrared radiator 13 to 800° C, in order to effect the gas etching. The surface of the substrate body 15, heated to this temperature is then reduced to 600° C and is optically activated with the aid of a UV radiator 16, in certain regions (not shown in the FIG.) by using a diaphragm 17, or heated to temperatures up to 1,000° C, so that a silicon precipitation occurring only thereon produces on the substrate body 15, a pattern according to the irradiated energy. The UV radiation enters through a planar-ground quartz plate 18, into the reaction chamber 4. The arrows 19 and 20 which issue from the radiation sources 13 and 16, are to indicate the direction of the energy impingement.

I claim:

1. In the method for producing highly pure, monocrystalline silicon layers, upon a wafer shaped substrate body, through thermal dissociation of a gaseous silane, thus precipitating silicon upon a heated substrate body located in a reaction chamber, whose crystalline structure is exposed and its surface is flooded by the reaction gas, the improvement which comprises using as the silane, a dihalosilane of formula $SiH_2X_2$, wherein X is chlorine, bromine, or iodine and the thermal dissociation is effected through heating the substrate body to a temperature between 600° and 1,000° C by IR radiation and the dissociation at the surface of the substrate is catalytically actuated by UV radiation.

2. The method of claim 1, wherein the thermal dissociation of the silane compound is effected in a noble gas atmosphere.

3. The method of claim 1, wherein the gaseous silane is mixed with a carrier gas.

4. The method of claim 3, wherein hydrogen is used as the carrier gas.

5. The method of claim 3 wherein the IR radiation for regional heating of the substrate body is concentrated upon specific points of the substrate body.

6. The method of claim 3, wherein the IR heating of specific regions of the surface of the substrate body is effected by laser beams.

7. The method of claim 1, wherein the substrate body is subjected, prior to thermal dissociation of the silane compound, to a surface treatment through the action of sulphur hexafluoride ($SF_6$) or nitrogen trifluoride ($NF_3$), in a noble gas atmosphere and at temperatures between 500° and 800° C.

8. The method of claim 1, wherein the thermal dissociation is carried out in a dynamic vacuum of $10^{-3}$ to 1 Torr.

* * * * *